United States Patent Office 2,718,875
Patented Sept. 27, 1955

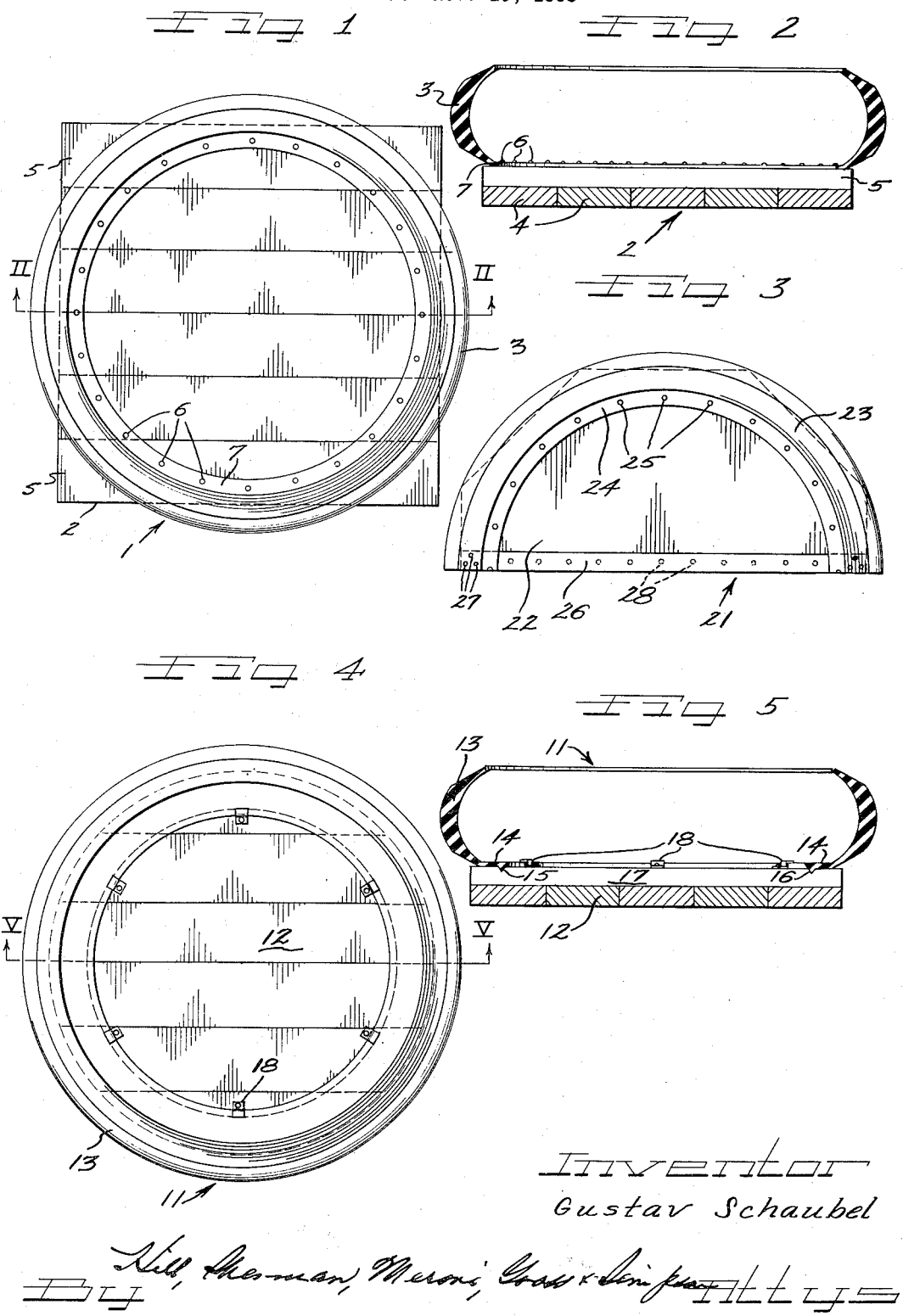

2,718,875

FEED TROUGH

Gustave Schaubel, Parkman, Wyo.

Application November 19, 1953, Serial No. 393,191

2 Claims. (Cl. 119—61)

The present invention relates to a feed trough, and more particularly to a feed trough having side walls of such a construction as to resist upsetting by the cattle or the like which are feeding from the trough.

One of the important features of the present invention is the provision of feed trough of such construction as to prevent the cattle feeding from the trough from upsetting the same in their customary manner. It has been an important problem among cattlemen in particular and among raisers of livestock generally, to prevent the livestock from upsetting the trough for the feed. This problem is particularly acute in troughs for salt and like mineral feeds, for reasons unknown to me at this time.

Therefore, it is an important object of the present invention to provide a feed trough having elastic, flexible or resilient container side walls thereby to prevent livestock and cattle from upsetting the trough. By the provision of resilient or elastic or flexible side walls for the trough, "nosing-in" by the cattle against the trough does not give the cattle or other livestock a sufficiently stiff structure against which to push to permit the upsetting of the trough.

Another difficulty which has been frequently encountered in the use of feed troughs and the like is that cattle and livestock have an unexplained tendency to push the trough under a fence to the other side of the same where the cattle cannot get to the trough to feed therefrom. By the provision of resilient or elastic or flexible side walls for the trough such pushing of the trough is made extremely difficult for the cattle and the pushing is substantially prevented.

It is, therefore, still another important object of the present invention to provide a feed trough or the like with resilient side walls or flexible elastic side walls to substantially prevent livestock from moving the feed trough.

Still another object of the present invention is to provide a feed trough or the like which may be inexpensively constructed from materials readily found around the ranch or farm, such as wood planking or concrete slabs or the like to form a substantially solid base and old tires or the like secured to the base to form resilient, elastic or flexible side walls for the feed troughs.

Still another object of the present invention is to provide a feed trough or the like having a substantially solid base and toroidal side wall members of elastic or flexible or resilient material.

Still another object of the present invention is to provide a new and improved feed trough having improved characteristics and an inexpensive and simple construction.

Still other objects, features and advantages of the present invention will become readily apparent from the following detailed description, from the claims, and from the accompanying drawings in which there is stated preferred embodiments of the present invention, which fully and completely disclose each and every detail shown thereon, in which like reference numerals refer to like parts, and in which:

Figure 1 is a top plan view of a first embodiment of the present invention and illustrates a feed trough in accordance with the principles of the present invention;

Figure 2 is a sectional view of the trough of Figure 1, taken substantially along the line II—II of Figure 1;

Figure 3 is a top plan view of another embodiment of the present invention;

Figure 4 is a top plan view of still another embodiment of the present invention; and Figure 5 is a sectional view of the embodiment of Figure 4 and is taken substantially along the line V—V thereof.

Feed troughs and the like for cattle specifically and livestock generally are particularly important as a means for providing mineral feeds for cattle. Such mineral feeds as salt and the like must be set out for the cattle and it has been found most expedient for this end to set such mineral feeds out in relatively small feed troughs having but a few square feet of base area. Heretofore known types of feed troughs were substantially rigid containers which were readily pushed about by the cattle and other livestock and readily upset by the livestock. Feed troughs embodying the principles of my invention, however, are adapted to resist such pushing about and such upsetting. A first embodiment of a feed trough in accordance with the principles of my invention is illustrated in Figures 1 and 2 wherein there is shown a feed trough 1 having a substantially heavy base 2 and a trough side wall member 3 secured thereto. The base 2 is rigid and substantially flat while the side wall member 3 is formed of a material such as an elastomer or the like and has resilient and/or flexible and/or elastic properties so that cattle nosing into the same will merely deform the side wall member of the trough wall member 3 without being able to push the trough 1 from place to place and without being able to upset the trough.

In this first embodiment of my invention (Figures 1 and 2) the base 1 is illustrated as being constructed from a pair of layers or laminations of wood planking or the like which are cross-laid to provide a substantially solid base. That is, while the bottom row of planks 4 in the base 2 are laid in one direction, the top row of planks 5 are laid transversely with respect to the bottom row and secured together and to the bottom row of planks, thereby providing a relatively heavy or weighty substantially solid base. The base may, of course, be formed of any substantially rigid material, preferably such as wood, concrete, a suitable metal or the like, or of ceramic materials suited for this purpose.

The trough walls 3 are preferably formed, molded or drawn or extruded or the like from materials as discussed above therefor, and provided with any desired configuration but preferably with an arcuate toroidal configuration such as that shown. The member 3 is secured by convenient securing means such as nails or screws or clamps or the like 6 which hold the wall member 3 in place on the base 2.

I have found that a most convenient wall forming member for the trough is a tire or the like which may or may not be "bald" as found or as otherwise available. In the embodiment of the present invention illustrated in Figures 1 and 2 a discarded tire has had the beads and a substantial portion of the side walls removed therefrom to form the trough wall 3. On one side, however, a small part or marginal rim of the side wall has been left secured to the tread portion of the tire, as indicated at 7, and it is through this portion of the side wall member 3 that the securing means 6 are driven for securing the trough walls to the base.

Another form of the present invention is illustrated in Figures 4 and 5 wherein the construction is very similar to that of the construction of the feed trough of Figures 1 and 2 and wherein the trough 11 has a base 12 formed of a multiple layer of cross-laid planking or the like and wherein a trough wall member 13 is secured to the upper surface thereof. In this embodiment of the invention the base 12 is preferably cut to a circular configuration or the like to conform to the configuration of the wall member 13 rather than left square or the like and not conforming to the configuration of the wall member as illustrated in Figures 1 and 2. Here, Figures 4 and 5, the trough wall member 13 is formed preferably in the manner of forming the trough wall member 3 of Figure 1 and 2, but in the case of employing an old tire or the like, one of the side walls is removed and the other thereof is left intact as at 14 with the bead 15 remaining thereon. A groove or the like 16 is cut in the upper surface planks 17 to have the bead 15 fitted thereinto, and held thereby. Securing the trough wall 13 to the base 12 may be accomplished as hereinabove described with nails or screws or the like, but here it is preferred to use a plurality of clamps or the like 18 which are configurated to overlie the bead portion 15 and which are stepped to have a portion thereof lie against the upper face of the upper planks or boards 17. Screw means or nail means or the like are then run through the clamps into the baseboards and thereby secure the clamps 18 and the wall member 13 rigidly in place on the base 12.

It will be clearly seen that this embodiment of the present invention, Figures 4 and 5, has all of the features and advantages incorporating principles of my invention.

Still another embodiment of the present invention is illustrated in Figure 3 wherein a feed trough is so constructed so as to permit the construction of two or more troughs from a single discarded tire or the like and wherein two or more troughs incorporating the principles of my invention may be juxtaposed and together require no more space than one feed trough such as those illustrated in Figures 1 and 2, and 4 and 5.

The segmental feed trough illustrated in Figure 3 and identified by the numeral 21, has a base 22 which is illustrated as a single thickness base of a single slab of material and which is configurated to substantially conform to the peripheral contour of the trough wall member 23 secured to the upper side thereof. The base 22 is illustrated as having a semi-octagonal peripheral configuration with a minimum dimension at least sufficiently great to permit securing of the trough member 23 thereto.

The trough wall member 23 is arcuate or semicircular toroidal configurated substantially the same as the trough wall members 3 and 13 of the other illustrated and described embodiments of my invention and may be formed as hereinabove described for the other embodiments of my invention. That is, it may be molded or drawn or pressed or the like or may be formed from such available inexpensive material as discarded tires and the like with the side wall and bead substantially removed from one side and with the bead and a portion of the side wall removed from the other side as indicated at 24. Securing means such as nails, screws or the like 25 may be employed to secure the trough wall member 23 to the base 22 by running the same through the side wall 24 and into the base 22 as in a manner described hereinabove in connection with the embodiment of the invention illustrated in Figures 1 and 2. Of course, the trough wall member 23 may be secured to the base 22 by clamps or the like as described hereinabove in connection with the embodiment of my invention illustrated in Figures 4 and 5.

The segmental trough member 21 of this embodiment of this invention has been illustrated as being substantially semi-circular as a prefered size of segmental trough to hold feed material and particularly to hold such mineral feed materials as salt or the like. This segmental trough 21 is provided with a diametric wall or partition 26 which extends substantially across the entire diameter of the trough and is secured both to the trough wall members, as at 27 by any convenient means such as screws or nails or the like, and further secured to the base as by nails, screws or the like 28 as illustrated by the phantom circles.

The partition or diametric wall 26 has arcuate ends to fit tightly into the arcuate toroidal trough wall member 23 to substantially prevent loss of feed or the like between the ends of the partition and the inner surface of the wall member 23. The material from which the partition 26 may be formed, may be a resilient or flexible or elastic material but for convenience and inexpensiveness in accordance with the principles of the present invention is preferably formed of the same material as the material from which the base 22 is constructed.

From the foregoing it will readily be observed that numerous variations and embodiments of the principles of my invention may be effected without departing from the true spirit and scope of the novel concepts and principles of my invention. I, therefore, intend by the claims to cover all such modifications and variations as fall within the true spirit and scope of the novel concepts and the principles of my invention.

I claim as my invention:

1. A feed trough operable to hold feed and the like for livestock and to resiliently resist upsetting by the livestock feeding from the contents thereof, comprising, a substantially flat base of substantially solid construction and formed from a plurality of layers of cross-laid lumber, a groove formed in a face of said base, and a resiliently deformable side wall member formed from a motor vehicle tire having one side wall and bead removed therefrom and having the other bead mating with said groove in said base, and a plurality of clamps securing said side wall member to said base with the bead in said groove whereby said side wall member and said base together define an open top container.

2. A feed trough operable to hold feed and the like for livestock to resiliently resist upsetting by the livestock feeding from the contents thereof, comprising, a substantially flat and solid base member, and a resiliently deformable side wall member formed from substantially one semiannular half of a motor vehicle tire having one side wall and bead removed therefrom secured to said base member to define an open top container together with said base member, and a supplemental wall member extending diametrically across said tire to substantially enclose a semicircular open topped trough.

References Cited in the file of this patent
UNITED STATES PATENTS
2,592,638    Andrew _____ Apr. 15, 1952